US012253211B2

(12) United States Patent
Kreutzkaemper et al.

(10) Patent No.: US 12,253,211 B2
(45) Date of Patent: Mar. 18, 2025

(54) LUBRICATION SYSTEM (71) Applicant: SKF LUBRICATION SYSTEMS GERMANY GMBH, Walldorf (DE)

(72) Inventors: Juergen Kreutzkaemper, Waibstadt-Daisbach (DE); Dieter Hess, Ludwigshafen (DE); Markus Mandera, Leimen (DE); Andreas Schoenfeld, Sankt Leon-Rot (DE); Stefan Schuermann, Walldorf (DE); Dennis Zahn, Karlsdorf-Neuthard (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 0 days.

(21) Appl. No.: 18/286,860

(22) PCT Filed: Apr. 25, 2022

(86) PCT No.: PCT/EP2022/060841
§ 371 (c)(1),
(2) Date: Oct. 13, 2023

(87) PCT Pub. No.: WO2022/233620
PCT Pub. Date: Nov. 10, 2022

(65) Prior Publication Data
US 2024/0200719 A1 Jun. 20, 2024

(30) Foreign Application Priority Data
May 6, 2021 (DE) .......................... 102021204617.7

(51) Int. Cl.
*F16N 7/38* (2006.01)
*F16N 25/00* (2006.01)
(52) U.S. Cl.
CPC ............. *F16N 7/385* (2013.01); *F16N 25/00* (2013.01); *F16N 2250/04* (2013.01)

(58) Field of Classification Search
CPC .......... F16N 25/02; F16N 25/00; F16N 7/385; F16N 27/00; F16N 2250/04
(Continued)

(56) References Cited

U.S. PATENT DOCUMENTS 4,044,924 A * 8/1977 Saretzky ................. F16N 13/22
184/7.4
4,390,083 A * 6/1983 Saretzky ................. F16N 7/385
184/7.4
(Continued)

FOREIGN PATENT DOCUMENTS

CN 205938481 U 2/2017
CN 210219262 U 3/2020
(Continued)

OTHER PUBLICATIONS

English translation of the Written Opinion of the International Searching Authority in parent application No. PCT/EP2022/060841.
(Continued)

*Primary Examiner* — Henry Y Liu
(74) *Attorney, Agent, or Firm* — J-TEK LAW PLLC; Scott T. Wakeman; Mark A. Ussai (57) ABSTRACT A lubrication system includes a progressive distributor and at least one pressure sensor. The progressive distributor includes a housing block having a lubricant inlet, a plurality of lubricant outlets, a plurality of piston bores fluidically connected to the lubricant inlet, each of the plurality of piston bores having a first outlet bore and a second outlet bore, and a metering piston in each of the plurality of piston bores. Each of the metering pistons is displaceable in a respective one of the plurality of outlet bores to uncover either the first outlet bore or the second outlet bore. The pressure sensor is disposed at an inlet of the progressive distributor upstream of the metering pistons with respect to
(Continued)

a lubricant flow direction and configured to determine a lubricant pressure.

15 Claims, 5 Drawing Sheets

(58) Field of Classification Search
USPC .......................................................... 184/7.4
See application file for complete search history.

(56) References Cited

U.S. PATENT DOCUMENTS

| | | | | | |
|---|---|---|---|---|---|
| 4,393,958 | A | * | 7/1983 | Saretzky | F16N 25/00 184/7.4 |
| 4,397,376 | A | * | 8/1983 | Saretzky | F16N 25/02 184/7.4 |
| 4,502,567 | A | * | 3/1985 | Kärcher | F16N 25/02 184/7.4 |
| 4,537,284 | A | * | 8/1985 | Breisinger | F16N 25/02 184/29 |
| 4,609,073 | A | * | 9/1986 | Knaebel | F16N 25/02 417/349 |
| 4,712,649 | A | * | 12/1987 | Saam | F16N 25/02 137/119.06 |
| 4,895,192 | A | * | 1/1990 | Mortenson | F01M 11/04 137/625.68 |
| 4,921,072 | A | * | 5/1990 | Divisi | F16N 25/02 137/119.06 |
| 4,972,925 | A | * | 11/1990 | Saretzky | F16N 25/02 184/7.4 |
| 5,209,324 | A | * | 5/1993 | Hogbacka | F28G 15/00 184/7.4 |
| 5,311,968 | A | * | 5/1994 | Pingel | F16N 25/00 184/29 |
| 5,628,384 | A | * | 5/1997 | Mismas | F16N 25/02 184/6.24 |
| 5,730,174 | A | * | 3/1998 | Mismas | F15B 13/0835 137/271 |
| 5,799,751 | A | * | 9/1998 | Winkler | B23Q 11/123 184/105.3 |
| 7,735,608 | B2 | * | 6/2010 | Paluncic | F16N 25/02 184/7.4 |
| 8,037,968 | B2 | * | 10/2011 | Brendel | F16N 13/06 184/26 |
| 8,469,150 | B2 | * | 6/2013 | Paluncic | F16N 25/02 184/7.4 |
| 8,596,418 | B2 | * | 12/2013 | Brendel | F16N 13/06 184/6.14 |
| 9,151,194 | B2 | * | 10/2015 | Schmitt | F01M 9/00 |
| 9,151,444 | B2 | * | 10/2015 | Powell | F16N 25/02 |
| 9,371,963 | B2 | * | 6/2016 | Brendel | F16N 29/04 |
| 9,423,039 | B2 | * | 8/2016 | Divisi | F16N 25/02 |
| 10,969,059 | B2 | * | 4/2021 | Guenther | F16N 29/02 |
| 11,199,204 | B2 | * | 12/2021 | Hess | F15B 15/04 |
| 11,898,695 | B2 | * | 2/2024 | Hess | F16N 13/22 |
| 2005/0003036 | A1 | * | 1/2005 | Nishimura | B29C 45/83 425/149 |
| 2005/0163626 | A1 | * | 7/2005 | Paluncic | F16N 25/02 417/244 |
| 2007/0187181 | A1 | * | 8/2007 | Brendel | F16N 13/06 184/6.28 |
| 2008/0142304 | A1 | * | 6/2008 | Schutz | F16N 7/38 184/7.4 |
| 2010/0206667 | A1 | * | 8/2010 | Paluncic | F16N 25/02 184/7.4 |
| 2011/0233001 | A1 | * | 9/2011 | Brendel | F16N 13/06 184/6.14 |
| 2012/0273305 | A1 | * | 11/2012 | Brendel | F16N 29/04 184/7.4 |
| 2013/0118835 | A1 | * | 5/2013 | Schmitt | F16N 25/02 184/6 |
| 2014/0090929 | A1 | * | 4/2014 | Powell | F16N 29/04 184/6 |
| 2014/0124073 | A1 | * | 5/2014 | Divisi | F16K 11/10 137/625.48 |
| 2016/0033079 | A1 | * | 2/2016 | Guenther | F16N 29/04 184/7.4 |
| 2017/0261009 | A1 | * | 9/2017 | Paulessen | A01B 76/00 |
| 2018/0202603 | A1 | * | 7/2018 | Guenther | F16N 7/385 |
| 2019/0040997 | A1 | * | 2/2019 | Kreutzkaemper | H02N 2/18 |
| 2020/0318658 | A1 | * | 10/2020 | Hess | F04B 9/105 |
| 2021/0317949 | A1 | * | 10/2021 | Hess | F16N 27/00 |
| 2022/0107053 | A1 | * | 4/2022 | Hess | F16N 25/02 |
| 2024/0133517 | A1 | * | 4/2024 | Kreutzkämper et al. | F16N 25/02 |

FOREIGN PATENT DOCUMENTS

CN 112113126 A 12/2020
DE 102004032453 A1 1/2006

OTHER PUBLICATIONS

English translation the International Search Report dispatched Nov. 10, 2022 for parent application No. PCT/EP2022/060841.

* cited by examiner

LUBRICATION SYSTEM

CROSS-REFERENCE

This application is the U.S. National Stage of International Application No. PCT/EP2022/060841 filed on Apr. 25, 2022, which claims priority to German patent application no. 10 2021 204 617.7 filed on May 6, 2021.

The present invention relates to a lubrication system according to the preamble of patent claim 1.

BACKGROUND

In lubrication systems, for example, central lubrication systems, that include a progressive distributor, different malfunctions or even complete failures can occur. Such a lubricant system can include a main progressive distributor to which a plurality of further distributors or pistons are connected, which in turn transfer lubricant to connected consumers. Here a complete blockage of a lubricant line or of a piston, a line break, or even only a kink in a line, etc. can occur. Up to now, malfunctions of the pistons can be recorded by a piston detector that monitors the movement of a piston and detects faults that cause the piston to no longer move. However, only complete blockages or a failure of the lubricant supply are thereby detected. Line breaks in the downstream part of the distributor system, partial blockages, or impending blockages cannot be detected. Furthermore, a complete blockage is recognized in a time-delayed manner since the lines of the system can house lubricant even with a complete blockage so that unblocked distributors still distribute lubricant for a certain amount of time without a fault being detected.

In order to be able to detect further malfunctions, further sensors are required that must be disposed at many different points of the lubrication system in order to make possible a comprehensive monitoring. Thus, for example, a line break monitor, a flow sensor, and/or pressure sensors must be provided at each outlet of the progressive distributor.

SUMMARY

It is therefore an aspect of the present disclosure to provide a lubrication system that makes possible a simple and more cost-effective recording of an operating state of the associated lubrication system.

The disclosed lubrication system includes a progressive distributor, wherein the progressive distributor includes a housing block. The housing block furthermore includes a lubricant inlet bore via which lubricant is introducible into the progressive distributor and a plurality of lubricant outlet bores via which a metered quantity of lubricant is dispensable to a consumer connected to the respective lubricant outlet bore. Furthermore, for the dispensing of the metered quantity of lubricant, a plurality of metering pistons are provided in the housing, which metering pistons are received in associated piston bores, wherein two lubricant outlet bores are associated with each piston bore, and the metering piston is displaceable in the piston bore and is configured to alternatively release the one or the other lubricant outlet bore in order to dispense the metered quantity of lubricant to the consumer via the lubricant outlet bore. Here the piston bores are in fluidic connection with the lubricant inlet bore, and the piston bores are mutually fluidically connected to one another via connecting bores in order to transfer lubricant to the other piston bores.

In order to monitor the operating state of the lubrication system, at least one pressure sensor is provided that is configured to determine a lubricant pressure, wherein the pressure sensor is disposed upstream of the metering pistons with respect to a lubricant flow direction. That is, the pressure sensor determines the lubricant pressure before the lubricant reaches the first metering piston.

The inventors have surprisingly established that a pressure sensor that is disposed upstream of the metering pistons in a lubricant flow direction allows a more precise state recording than a piston detector, a flow sensor, and/or a line break monitor alone, and additionally is more cost-effective, in particular more cost-effective than a combination of these three types of monitors. Since the pressure sensor is installed near the inlet of the first progressive distributor of the lubrication system, the pressure sensor records the pressure level in the lubricant line at this point. In particular, in order to displace a metering piston of the progressive distributor so that the lubricant can be dispensed at an outlet, the drive for displacing the metering piston against the pressure at the outlet is the pressure at the inlet. It therefore applies that the pressure at the inlet must be slightly higher than the pressure at the outlet, in order to make possible a displacing of the metering piston. Here it can be concluded in a simplified manner that the pressure at the inlet corresponds approximately to the pressure at the currently controlled outlet. In other words, due to the operating principle of a progressive distributor, at the inlet of the distributor the pressure level is approximately that of the lubricant outlet controlled at the time, i.e., when, for example, the first lubricant outlet of the progressive distributor dispenses lubricant; at the inlet of the distributor the pressure level is approximately the lubricant pressure of the first lubricant outlet.

Here the pressure sensor can be integrated into the lubricant inlet bore. Furthermore, the lubricant inlet bore can be connectable to a lubricant source via an inlet line, wherein the pressure sensor is integrated into the inlet line. The progressive distributor can thereby be more easily exchanged without the pressure sensor also having to be exchanged.

Alternatively the pressure sensor can be a separate element that is connected to the lubricant inlet bore and/or the inlet line. This makes it possible to more easily exchange the pressure sensor. It is particularly advantageous that in this case an exchange of the lubricant line or of the progressive distributor can be omitted, whereby an exchange of the pressure sensor is simpler and more cost-effective.

Furthermore, the pressure sensor can be integrated into the housing block of the progressive distributor. This has the advantage that the progressive distributor and the pressure sensor can be installed as a single part in the lubrication system.

According to a further preferred exemplary embodiment, the pressure sensor is connected to a control device, wherein the control device is configured to determine, based on the lubricant pressure determined by the pressure sensor, a pressure level at a controlled lubricant outlet bore and/or a lubricant outlet associated with the lubricant outlet bore. The data that are transmitted from the pressure sensor to the control device can preferably be transmitted by cable and/or wirelessly, such as, for example, by WLAN.

In particular, the control device can be configured to recognize lubrication cycles based on the measured values of the pressure sensor and to determine the average pressure of a lubrication cycle. The control device can also be configured to continuously recognize the lubrication cycles and to determine such an average pressure for each lubrication cycle. The control device can subsequently compare the determined average pressure of a lubrication cycle to a normal pressure of the lubrication system. Based on the comparison result, the control device can determine the state of the lubrication system.

In addition to the average pressure of a lubrication cycle, the control device can furthermore be configured to determine a maximum pressure of a lubrication cycle, a minimum pressure of a lubrication cycle, and a temperature of the lubrication system. In particular, the sensor can continuously transfer measured values to the control device, wherein the control device determines from these measured values or pressure values the maximum and the minimum pressure. The average pressure can be determined by averaging of all measured pressure values.

According to a further exemplary embodiment, the lubrication system can include at least one downstream (second) progressive distributor, which is disposed downstream from the first progressive distributor with respect to the lubricant flow direction. Furthermore, a plurality of downstream (second) progressive distributors can also be provided that are connected to one another in series and/or parallel. In other words, downstream progressive distributors can be connected to one or more of the lubricant outlets of the first progressive distributor. The number of consumers or lubrication points suppliable with lubricants from a lubricant source can thereby be increased in a simple manner. A single pressure sensor at the inlet of the first progressive distributor allows a complete monitoring of the entire downstream lubrication system. The pressure sensor is preferably configured such that it determines the lubricant pressure multiple times within a lubrication cycle.

According to a further exemplary embodiment, at least one consumer is connected to one of the lubricant outlet bores via an associated lubricant outlet line, wherein the control device is configured to determine an operating state of the lubricant outlet line based on the determined lubricant pressure and based on at least one predetermined parameter of the lubricant outlet line and/or of a consumer. In particular, conclusions about the state of the downstream lubrication system can be drawn from the pressure sensor disposed at the inlet of the progressive distributor, which pressure sensor records the pressure in the lubricant line. The control device is preferably configured to determine, based on the at least one predetermined parameter, an operating state of a plurality of lubricant outlet lines connected to the at least one first progressive distributor. For example, the control device can be configured to detect and determine an operating state, for example, a normal operation, as well as possible faults, such as, for example, a line break and/or a blockage.

The lubrication system is preferably provided with at least one valve, in particular a pressure-limiting valve. Here the at least one valve can preferably be disposed upstream of the consumer. In particular, the pressure-limiting valve can be configured such that it opens starting from a predetermined pressure. In other words, the pressure-limiting valve opens as soon as a predetermined pressure value is exceeded. A constant pressure can thereby be achieved in particular in front of the consumer or a lubrication point. In addition, the use of a pressure-limiting valve has the advantage that a line break upstream of the pressure-limiting valve can be detected very quickly, since the lubricant pressure required for the opening of the pressure-limiting valve is no longer reached.

"Fault-free operation" is understood to mean operation of the lubrication system wherein the lubrication system works properly without faults or malfunctions. "No function" of the lubrication system means that no function of the lubrication system is detected at all. This can be the case when there is a complete failure of the lubrication system or when the sensor has completely failed.

A malfunction of the lubrication system can be a blockage of a lubricant line or of a piston, a kink of lubricant line, a line break of a lubricant line, or another malfunction of the lubrication system, wherein, however, a certain quantity of lubricant is still pumped. A "blockage" is understood to mean that a lubricant line is blocked, for example, by foreign bodies, grease deposition, or the like. In particular, this blockage can build up continuously, for example, by the flow through the lubricant line being increasingly reduced.

Furthermore, the control device can be configured to determine from a change of the determined lubricant pressure over a prescribed period of time a change of the operating state of the progressive distributor, lubricant outlet lines, and/or consumers downstream from the at least one first progressive distributor. The at least one predetermined parameter is preferably a consumer type, a type of a lubricant point, a type of the lubricant, a length of the lubricant outlet line, and/or a temperature of the lubricant.

The control device can thus not only determine a pressure of the lubrication system and detect a dropping or increasing pressure, but can also determine an average pressure over a lubrication cycle and compare this to a normal pressure of the lubrication system that corresponds to normal operation of the lubrication system. By the comparing of a current average pressure to a normal pressure of the lubrication system, it is possible to detect proper operation or faulty states of the lubrication system. In addition to the pressure, the control device can in particular also receive a temperature of the lubrication system from the sensor.

Furthermore, the control device can be configured to recognize a lubrication cycle based on pressure fluctuations of the lubrication system. Due to the operating principle of a progressive distributor, the pressure in the lubrication system fluctuates during a lubrication cycle. These pressure fluctuations are more or less identical for each lubrication cycle, so that a start and an end of a lubrication cycle can be recognized based on these pressure fluctuations.

The pressure fluctuations depend on the individual design of a lubrication system, i.e., the number of components, the length of the lines, the arrangement of the components, the duration of the lubrication cycles, etc. However, the pressure fluctuations per lubrication cycle of a lubrication system are identical for each lubrication cycle, so that with deviations therefrom, malfunctions of the lubrication system can be detected.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
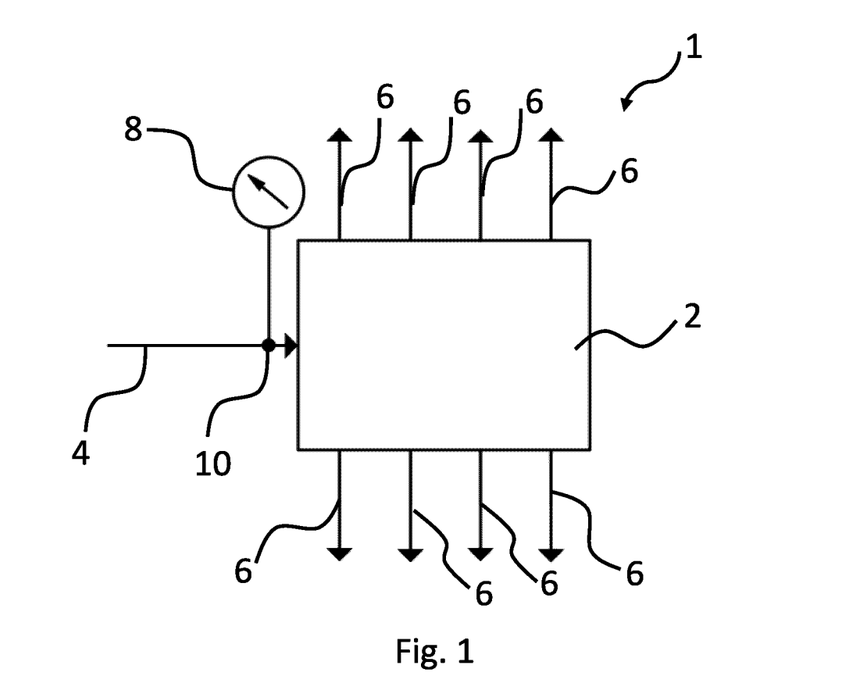
FIG. 1 shows a schematic depiction of a progressive distributor according to a first embodiment of a lubrication system.

FIG. 1 shows a schematic depiction of a progressive distributor 1 for lubricant including a housing block 2. Since the basic functioning and the components of a progressive distributor are known and not changed, an illustration and explanation of the metering pistons and piston bores as well as their functioning is omitted.

The housing block 2 has a lubricant inlet bore (not shown) via which lubricant is introducible into the progressive distributor 1 via a lubricant line 4 and a plurality of lubricant outlets 6 via which a metered quantity of lubricant is dispensable to a consumer connected to each respective lubricant outlet.

In the exemplary embodiment shown in FIG. 1, a T-piece 10 is provided in the lubricant line 4 via which a pressure sensor 8 is connected to the lubricant line. The pressure sensor 8 is configured to determine a lubricant pressure. Here the pressure sensor 8 is disposed upstream of the metering pistons with respect to a lubricant-flow direction. That is, the pressure sensor 8 determines the lubricant pressure before the lubricant reaches the first metering piston.

Due to the positioning of the pressure sensor 8 near the inlet of the progressive distributor, the pressure sensor 8 records the pressure level at this point in the lubricant line 4. Due to the mode of operation of the progressive distributor 1, the pressure level at the inlet of the distributor is approximately the pressure level of the currently controlled lubricant outlet 6.

Figure 2:
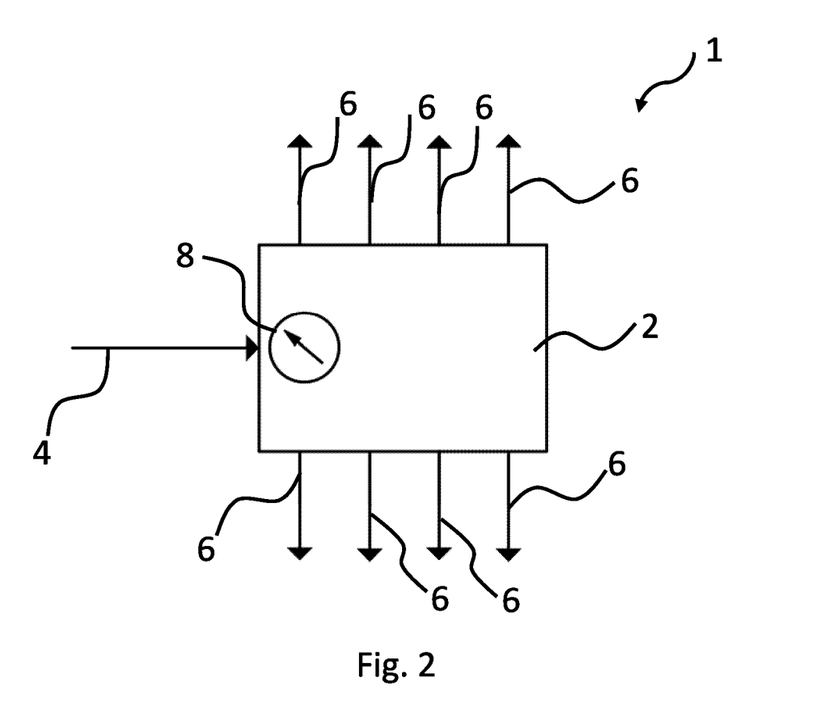
FIG. 2 shows a schematic depiction of a progressive distributor according to a second embodiment of the lubrication system.

FIG. 2 shows a second embodiment of the progressive distributor 1. The progressive distributor of FIG. 2 differs from the progressive distributor of FIG. 1 only in that the pressure sensor 8 is integrated in the housing block 2 of the progressive distributor so that the progressive distributor 1 and the pressure sensor 8 can be installed as one part into the lubrication system. Alternatively or additionally it is also possible to integrate the pressure sensor into the lubricant line 4.

Figure 3:
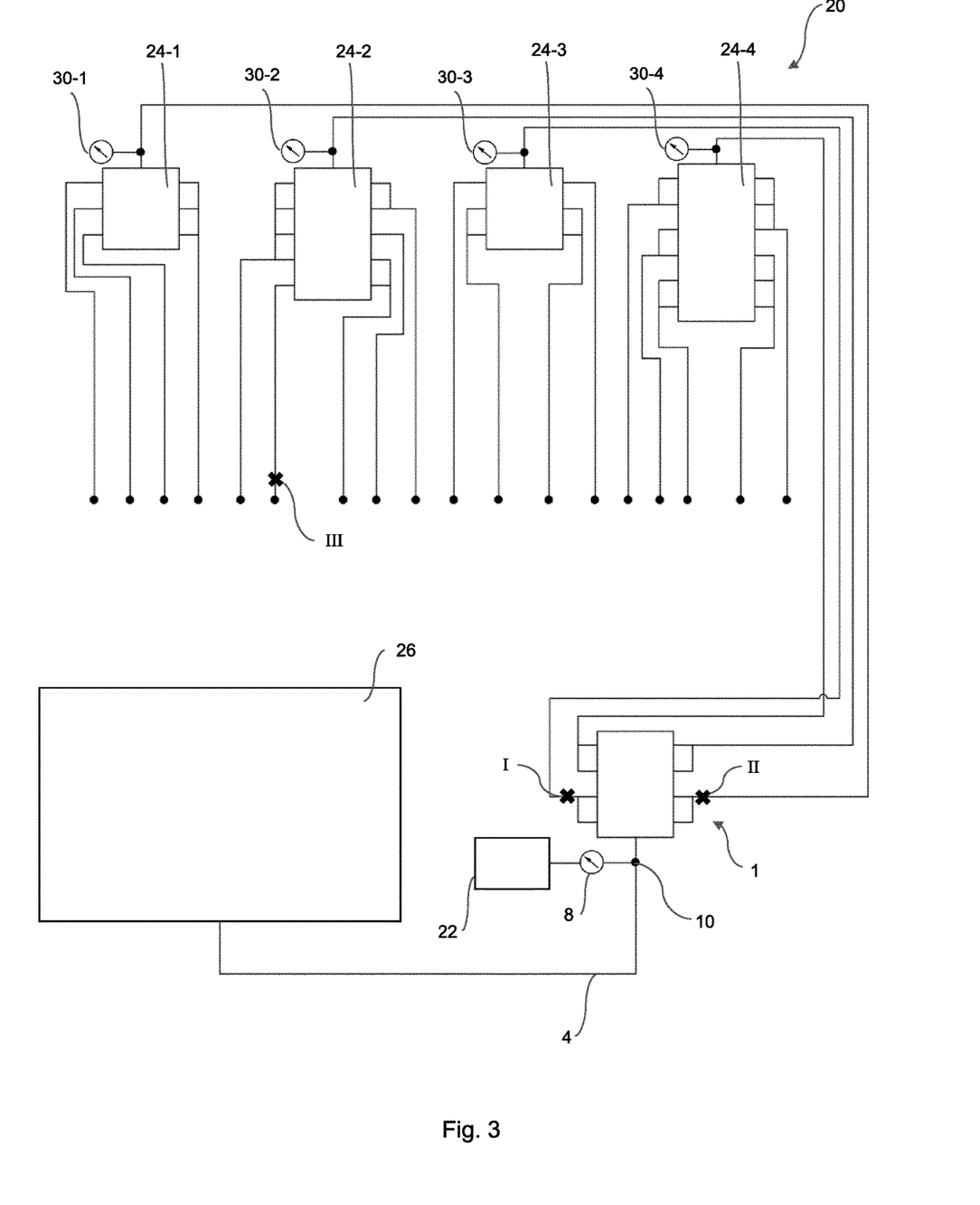
FIG. 3 shows a schematic depiction of an experimental design of a lubrication system according to a third embodiment.

FIG. 3 shows a first preferred exemplary embodiment of an inventive lubrication system 20. The lubrication system 20 comprises a progressive distributor 1 that is connected to a reservoir 26 via a lubricant line 4, wherein a pressure sensor 8 is disposed upstream from the progressive distributor 1 via a T-piece 10. The lubrication system 20 further comprises a control device 22 that is connected to the pressure sensor for data transmission by a data cable and/or wirelessly, e.g., by radio.

The lubrication system 20 has four downstream progressive distributors 24-1, 24-2, 24-3, 24-4 that are each connected to outlets 6 of the first progressive distributor 1. In the lubrication system 20 shown in FIG. 3, the downstream progressive distributors 24-1, 24-2, 24-3, 24-4 are configured similar to the progressive distributor 1 of FIG. 1, and each comprises a further pressure sensor 30-1, 30-2, 30-3, 30-4. However, it is also possible to use the downstream progressive distributors 24-1, 24-2, 24-3, 24-4 without a pressure sensor, since the individual pressure sensor 8 allows a complete monitoring of the entire lubrication system 20 at the inlet of the first progressive distributor.

Figure 4:
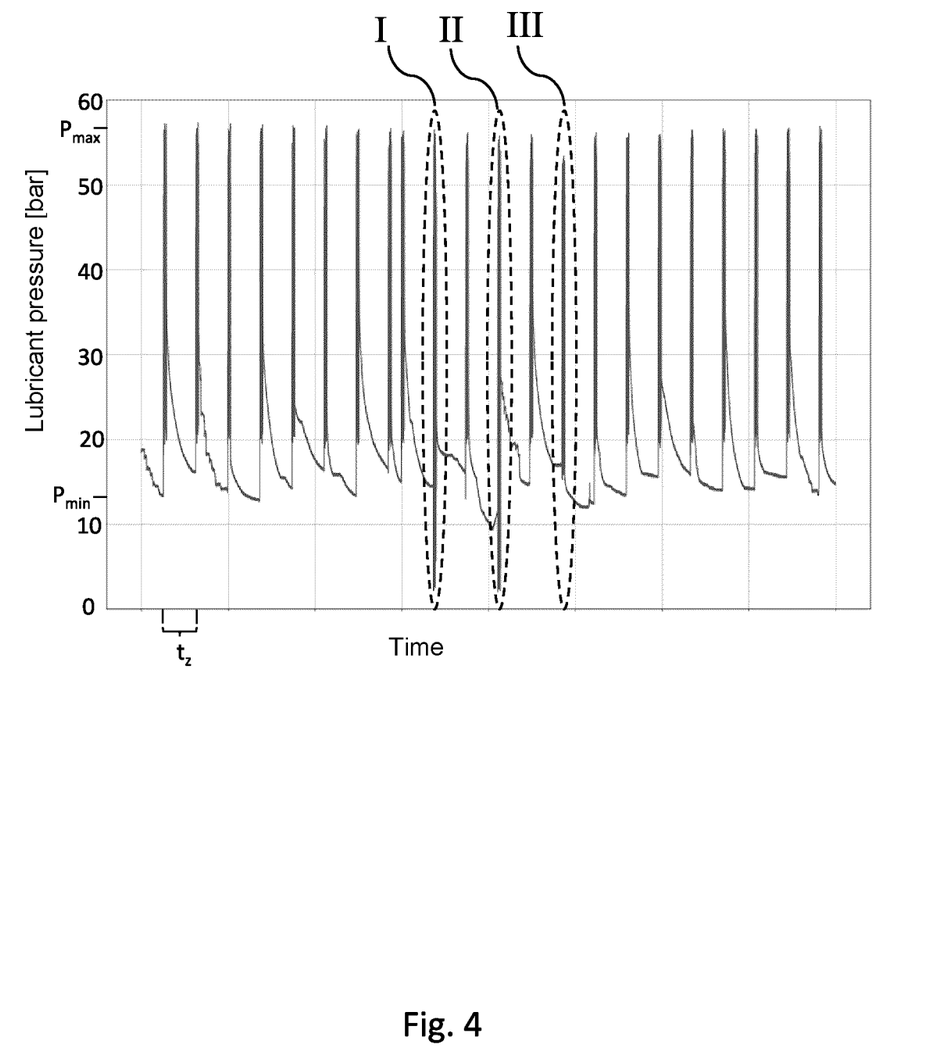
FIG. 4 shows a graph that represents the temporal course of a pressure level in the lubrication system of FIG. 3.

FIG. 4 shows in a graph the temporal course of the lubricant pressure that is measured by the pressure sensor 8. The dashed markings I, II, III designate the time points at which a line break has occurred in the lubrication system 20 of FIG. 3. Here the marking I indicates a break of the line at the location I on the progressive distributor 1 in FIG. 3, the marking II a break of the line at the location II also on the progressive distributor 1 in FIG. 3, and the marking III a break of the line at the location III on the progressive distributor 24-2 in FIG. 3. It is to be noted that each arising break of the line has been corrected after a cycle length $t_z$, for example, by the line being plugged in again. The line break is thereby visible only in the pressure course of one lubricant cycle $t_z$.

As can be seen in FIG. 4, a change of the pressure course at the marked locations I, II, III can be inferred from the lubricant pressure course recorded by the pressure sensor 8. That is, in the case of a line break, the course of the pressure differs from the course of the pressure that is present in the case of a normal operating state. This can be seen in particular at the peaks that each lie to the right of the marked peaks, since in the case of these peaks the broken line is connected again and therefore the normal operating state is present again.

As can be seen in FIG. 4, in the case of a line break (see marking I and II in FIG. 4) on the first progressive distributor 1, a minimum pressure value $P_{min}$ is very much lower than with a normal operating state, whereas in a line break at a downstream progressive distributor 24, a maximum pressure value $P_{max}$ turns out lower than with a normal operating state (see marking III in FIG. 4). That is, using the pressure sensor 8 at the inlet of the progressive distributor 1, not only can a line break at the progressive distributor 1 be determined, but also a line break on a progressive distributor 24 downstream from the progressive distributor 1. In particular, the control device 22 can be configured to detect and to determine a fault such as a line break based on the lubricant pressure recorded by the pressure sensor 8.

In particular, an influence of a line break on the pressure course is dependent on what proportion of the lubricant in the lubrication system 20 reaches into the environment without counter-pressure. If a line break now occurs, for example, after a primary progressive distributor 1 including eight outlets, ⅛ of the lubricant reaches into the environment without counter-pressure. If a line break in turn occurs after a downstream progressive distributor 24, which, for example, also includes eight outlets, ⅛ of the lubricant of this downstream progressive distributor 24 reaches into the environment, which in turn, however, corresponds to only 1/64 of the total lubricant. The influence on the pressure course is thus significantly smaller.

Figure 5:
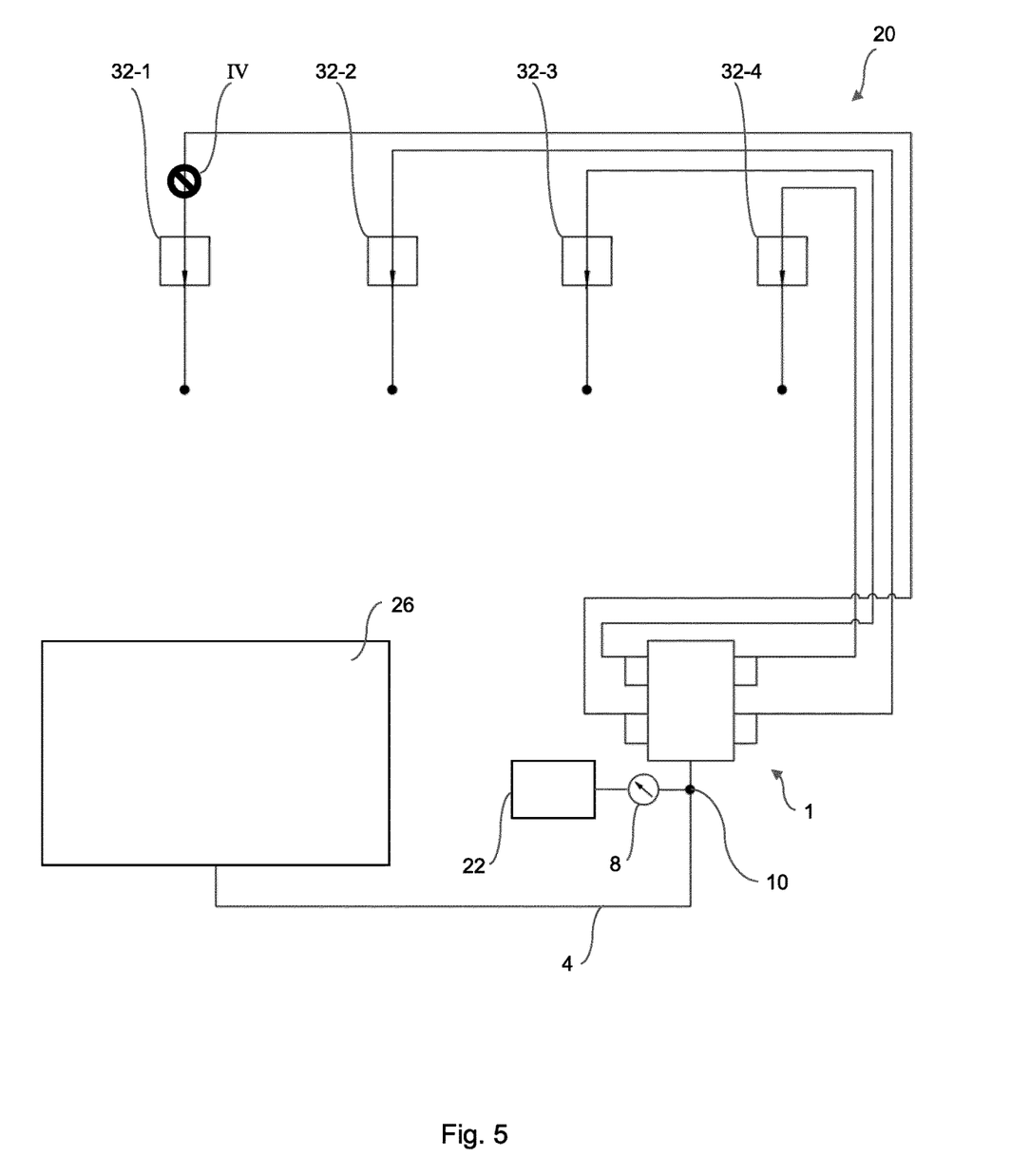
FIG. 5 shows a schematic depiction of an experimental construction of a lubrication system according to a fourth embodiment.

FIG. 5 shows a second preferred exemplary embodiment of the inventive lubrication system 20. The lubrication system 20 of FIG. 5 differs from the lubrication system of FIG. 3 in that instead of the downstream progressive distributors 24-1, 24-2, 24-3, 24-4, four valves 32-1, 32-2, 32-3, 32-4, are provided, wherein the valves 32-1, 32-2, 32-3, 32-4 can be configured in particular as pressure-limiting valves.

That is, exactly as in FIG. 3, the lubrication system 20 of FIG. 5 comprises a progressive distributor 1 that is connected to a reservoir 26 via a lubricant line 4, wherein a pressure sensor 8 is disposed upstream from the progressive distributor 1 via a T-piece 1. The lubrication system 20 further comprises a control device 22 that is connected to the pressure sensor 8 for data transmission by a data cable and/or wirelessly, e.g., by radio. As mentioned, the lubrication system 20 has four valves 32-1, 32-2, 32-3, 32-4 that are in turn connected to the outlets 6 of the first progressive distributor 1.

Figure 6:
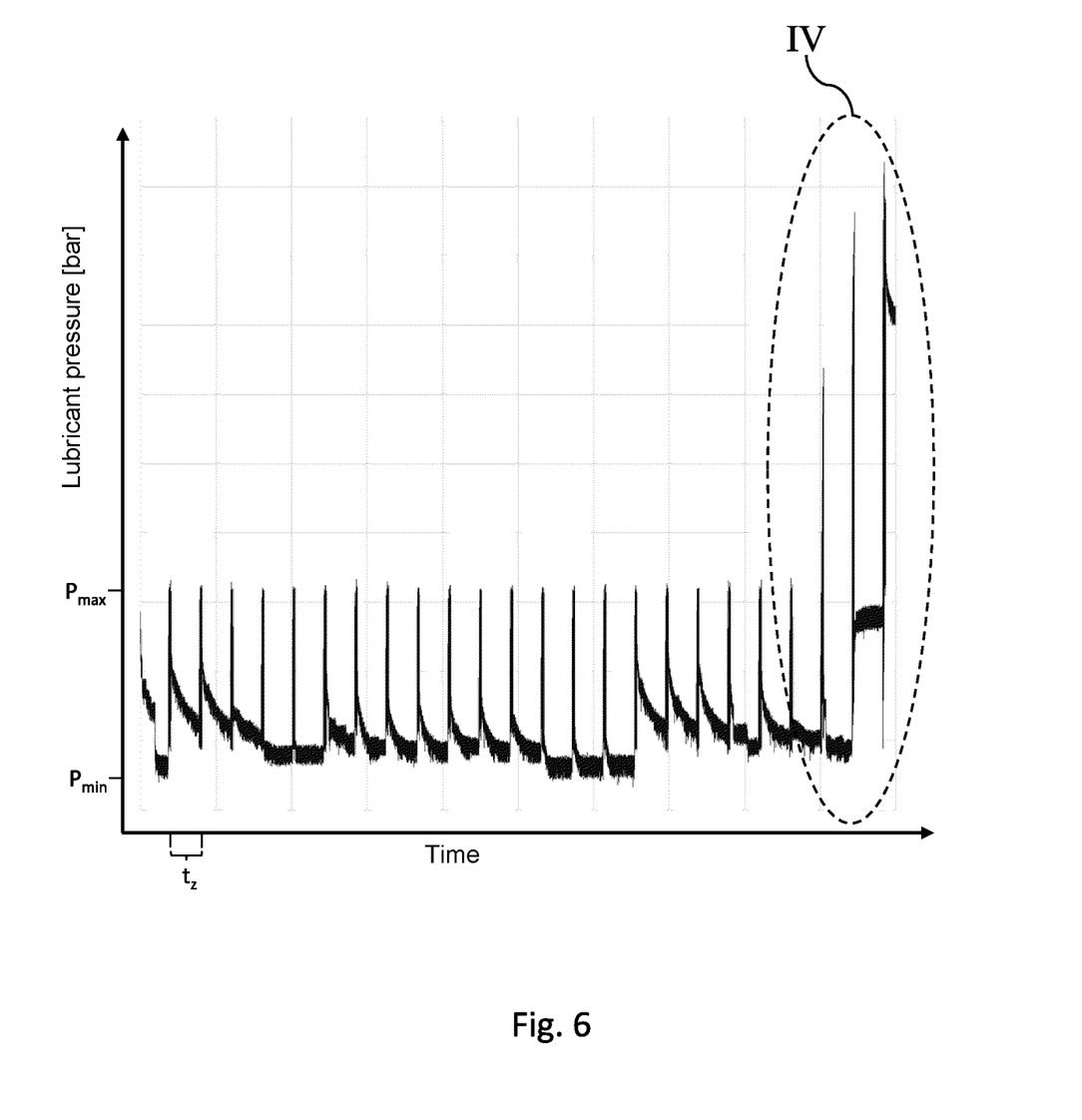
FIG. 6 shows a graph that represents the temporal course of a pressure level in the lubrication system of FIG. 5.

FIG. 6 shows in a graph the temporal course of the lubricant pressure that is measured by the pressure sensor 8. The dashed marking IV marks a time point at which a blockage of the line has occurred in the lubrication system 20. Here the marking IV indicates a blockage prior to the valve 32-1 in FIG. 5.

As can be seen in FIG. 6, a change can also be inferred from the lubricant pressure course in FIG. 5 recorded by the pressure sensor 8. It can be seen here that the maximum value $P_{max}$ of the lubricant pressure increases the longer the blockage lasts. In other words, the pressure sensor 8 can already detect a blockage at the inlet of the progressive distributor 1 at a time at which, for example, a conventional piston detector does not yet record any change. In particular, the control device 22 can be configured to detect and to determine the blockage based on the lubricant pressure recorded by the pressure sensor 8.

In summary, the pressure sensor 8 provided at the inlet allows a more precise state-recording than a piston detector, a flow sensor, or a line-break monitor alone, and is more cost-effective than a combination of these three types of monitoring. A single pressure sensor 8 at the inlet of the progressive distributor 1 allows a complete monitoring of the entire lubrication system 20. In comparison to a pressure sensor at an outlet, which pressure sensor is only able to monitor a single outlet, more information is available via the pressure sensor 8 at the inlet. In particular, changes of the pressure course allow conclusions to be drawn regarding a change in the lubrication system and the type of change, e.g., line break, impending blockage, etc.

REFERENCE NUMBER LIST

1 Progressive distributor
2 Housing block
4 Lubricant line
6 Outlet
8 Pressure sensor
10 T-piece
20 Lubrication system
22 Control device
24 Progressive distributor
26 Reservoir
30 Pressure sensor
32 Valve
$P_{max}$ Maximum pressure
$P_{min}$ Minimum pressure
$t_z$ Lubrication cycle

The invention claimed is:

1. A lubrication system including:
a progressive distributor; and
at least one pressure sensor,
wherein the progressive distributor includes a housing block having a lubricant inlet, a plurality of lubricant outlets, a plurality of piston bores fluidically connected to the lubricant inlet, each of the plurality of piston bores having a first outlet bore and a second outlet bore, and a metering piston in each of the plurality of piston bores,
wherein each of the metering pistons is displaceable in a respective one of the plurality of piston bores to uncover either the first outlet bore or the second outlet bore,
wherein a first one of the plurality of piston bores is fluidically connected to at least a second one of the plurality of piston bores by a first connecting bore and the second one of the plurality of piston bores is fluidically connected to at least a third one of the plurality of piston bores by a second connecting bore,
wherein the pressure sensor is disposed at an inlet of the progressive distributor upstream of the plurality of metering pistons with respect to a lubricant flow direction and configured to determine a lubricant pressure, and
wherein the pressure sensor is integrated into the housing block of the progressive distributor.

2. The lubrication system according to claim 1,
wherein the pressure sensor is connected to a control device, and wherein the control device is configured to determine, based on the lubricant pressure determined by the pressure sensor, a pressure level at the first outlet bore and/or at a lubricant outlet associated with the first outlet bore.

3. The lubrication system according to claim 1,
wherein the lubrication system includes at least one downstream progressive distributor that is disposed downstream from the first progressive distributor with respect to the lubricant flow direction.

4. The lubrication system according to claim 1,
wherein at least one consumer is connected to the first outlet bore via an associated lubricant outlet line, and wherein the control device is configured to determine an operating state of the lubricant outlet line based on the determined lubricant pressure and based on at least one predetermined parameter of the lubricant outlet line and/or of a consumer.

5. The lubrication system according to claim 4, including at least one pressure-limiting valve disposed upstream from the at least one consumer.

6. A lubrication system including:
a progressive distributor; and
at least one pressure sensor,
wherein the progressive distributor includes a housing block having a lubricant inlet, a plurality of lubricant outlets, a plurality of piston bores fluidically connected to the lubricant inlet, each of the plurality of piston bores having a first outlet bore and a second outlet bore, and a metering piston in each of the plurality of piston bores,
wherein each of the metering pistons is displaceable in a respective one of the plurality of piston bores to uncover either the first outlet bore or the second outlet bore,
wherein a first one of the plurality of piston bores is fluidically connected to at least a second one of the plurality of piston bores by a first connecting bore and the second one of the plurality of piston bores is fluidically connected to at least a third one of the plurality of piston bores by a second connecting bore,
wherein the pressure sensor is disposed at an inlet of the progressive distributor upstream of the plurality of metering pistons with respect to a lubricant flow direction and configured to determine a lubricant pressure, wherein the pressure sensor is connected to a control device, and wherein the control device is configured to determine, based on the lubricant pressure determined by the pressure sensor, a pressure level at the first outlet bore and/or at a lubricant outlet associated with the first outlet bore, wherein at least one consumer is connected to the first outlet bore via an associated lubricant outlet line, and wherein the control device is configured to determine an operating state of the lubricant outlet line based on the determined lubricant pressure and based on at least one predetermined parameter of the lubricant outlet line and/or of the at least one consumer, and wherein the at least one predetermined parameter is selected from the group consisting of: consumer type, type of a lubricant point, type of the lubricant, length of the lubricant outlet line, and/or a temperature of the lubricant.

7. The lubrication system according to claim 6, wherein the lubricant inlet bore is connectable to a lubricant source via an inlet line, and the pressure sensor is integrated into the inlet line.

8. The lubrication system according to claim 6, wherein the pressure sensor is a separate element that is connected to the lubricant inlet bore.

9. The lubrication system according to claim 6, wherein the lubricant inlet bore is connectable to a lubricant source via an inlet line, and wherein the pressure sensor is a separate element that is connected to the inlet line.

10. The lubrication system according to claim 6,
wherein the pressure sensor is integrated into the housing block of the progressive distributor.

11. A lubrication system including:
a first progressive distributor having a plurality of outlets; and
a second progressive distributor having an inlet fluidly connected to a first outlet of the plurality of outlets of the first progressive distributor and disposed downstream from the first progressive distributor with respect to a lubricant flow direction, and
at least one pressure sensor,
wherein the first progressive distributor includes a housing block having a lubricant inlet, and a plurality of piston bores fluidically connected to the lubricant inlet, each of the plurality of piston bores having a first outlet bore and a second outlet bore, and a metering piston in each of the plurality of piston bores, wherein each of the metering pistons is displaceable in a respective one of the plurality of piston bores to uncover either the first outlet bore or the second outlet bore, wherein a first one of the plurality of piston bores is fluidically connected to at least a second one of the plurality of piston bores by a first connecting bore and the second one of the plurality of piston bores is fluidically connected to at least a third one of the plurality of piston bores by a second connecting bore, wherein the pressure sensor is disposed at the lubricant inlet of the first progressive distributor upstream of the plurality of metering pistons with respect to the lubricant flow direction and configured to determine a lubricant pressure, wherein the pressure sensor is connected to a control device, and wherein the control device is configured to determine, based on the lubricant pressure determined by the pressure sensor, a pressure level at a first outlet of the second progressive distributor.

12. The lubrication system according to claim 11, wherein at least one consumer is connected to the first outlet bore via an associated lubricant outlet line, and wherein the control device is configured to determine an operating state of the lubricant outlet line based on the determined lubricant pressure and based on at least one predetermined parameter of the lubricant outlet line and/or of a consumer.

13. The lubrication system according to claim 12, including at least one pressure-limiting valve disposed upstream from the at least one consumer.

14. The lubrication system according to claim 11,
wherein the pressure sensor is integrated into the lubricant inlet bore.

15. The lubrication system according to claim 11,
wherein the pressure sensor is integrated into the housing block of the first progressive distributor.

* * * * *